(12) United States Patent
Damron et al.

(10) Patent No.: US 7,137,111 B2
(45) Date of Patent: Nov. 14, 2006

(54) AGGRESSIVE PREFETCH OF ADDRESS CHAINS

(75) Inventors: Peter C. Damron, Fremont, CA (US); Nicolai Kosche, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 531 days.

(21) Appl. No.: 09/996,088

(22) Filed: Nov. 28, 2001

(65) Prior Publication Data

US 2003/0105942 A1    Jun. 5, 2003

(51) Int. Cl.
*G06F 9/44* (2006.01)
*G06F 9/30* (2006.01)

(52) U.S. Cl. .................. 717/159; 717/154; 712/207

(58) Field of Classification Search ............... 717/154, 717/155, 159–161; 712/207, 216
See application file for complete search history.

(56) References Cited

U.S. PATENT DOCUMENTS

| | | | | |
|---|---|---|---|---|
| 5,526,499 | A * | 6/1996 | Bernstein et al. | 712/216 |
| 5,948,095 | A * | 9/1999 | Arora et al. | 712/207 |
| 5,964,867 | A | 10/1999 | Anderson et al. | |
| 6,092,180 | A | 7/2000 | Anderson et al. | |
| 6,098,166 | A * | 8/2000 | Leibholz et al. | 712/216 |
| 6,308,261 | B1 * | 10/2001 | Morris et al. | 712/219 |
| 6,314,431 | B1 | 11/2001 | Gornish | |
| 6,427,235 | B1 | 7/2002 | Kosche et al. | |
| 6,625,660 | B1 * | 9/2003 | Guthrie et al. | 709/248 |
| 6,675,374 | B1 * | 1/2004 | Pieper et al. | 717/154 |
| 6,675,380 | B1 * | 1/2004 | McKinsey et al. | 717/161 |
| 6,681,317 | B1 * | 1/2004 | Mathews | 712/203 |
| 6,697,932 | B1 * | 2/2004 | Yoaz et al. | 712/216 |
| 6,748,589 | B1 * | 6/2004 | Johnson et al. | 717/154 |
| 6,880,073 | B1 * | 4/2005 | Arimilli et al. | 712/245 |
| 2002/0056078 | A1 * | 5/2002 | Inagaki et al. | 717/155 |
| 2003/0074653 | A1 * | 4/2003 | Ju et al. | 717/154 |

FOREIGN PATENT DOCUMENTS

WO     WO 01/44927 A2    6/2001

OTHER PUBLICATIONS

Chi-Keung Luk and Todd Mowry, "Compiler-Based Prefetching for Recursive Data Structures," APLOS-VII, *Proceedings of the Seventh International Conf. on Architectural Support for Programming Languages and Operating Systems*, Oct. 1-5, 1996, Cambridge, MA, 12 pp.

M. H. Lipasti, et al. "SPAID: Software Prefetching in Pointer- and Call-Intensive Environments," Micro 28 *Proceedings of the 28th Annual International Symposium on Microarchitecture*, Nov. 29-Dec. 1, 1995, Ann Arbor, MI, 6 pp.

Todd C. Mowry, Monica S. Lam and Anoop Gupta, "Design and Evaluation of a Compiler Algorithm for Prefetching," ASPLOS-V, Proceedings of the Fifth International Conference on Architectural Support for Programming Languages and Operating Systems, 1992, pp. 62-73.

* cited by examiner

*Primary Examiner*—Tuan Dam
*Assistant Examiner*—Michael Yigdall
(74) *Attorney, Agent, or Firm*—Zagorin O'Brien Graham LLP

(57) ABSTRACT

Operations including inserted prefetch operations that correspond to addressing chains may be scheduled above memory access operations that are likely-to-miss, thereby exploiting latency of the "martyred" likely-to-miss operations and improving execution performance of resulting code. More generally, certain pre-executable counterparts of likely-to-stall operations that form dependency chains may be scheduled above operations that are themselves likely-to-stall.

41 Claims, 9 Drawing Sheets

AGGRESSIVE PREFETCH OF ADDRESS CHAINS

CROSS-REFERENCE TO RELATED APPLICATION(S)

This application is related to (1) U.S. patent application Ser. No. 09/630,052 entitled "Method and Apparatus for Software Prefetching using Non-Faulting Loads," naming Peter Damron and Nicolai Kosche as inventors, and filed 1 Aug. 2000 and to (2) U.S. patent application Ser. No. 09/679,431 entitled "System and Method for Scheduling Memory Instructions to Provide Adequate Prefetch Latency," naming Nicolai Kosche, Peter C. Damron, Joseph Chamdani and Partha Tirumalai as inventors, and filed 3 Oct. 2000.

BACKGROUND

1. Field of the Invention

The present invention relates to latency hiding in computer programs and, in particular, to techniques for scheduling code that includes pre-executable operations, such as prefetches and/or speculative loads, to improve execution performance.

2. Description of the Related Art

Computer systems typically include, amongst other things, a memory system and one or more processors and/or execution units. The memory system serves as a repository of information, while a processor reads information from the memory system, operates on it, and stores it back. As processor speeds and sizes of memory systems have increased, the mismatch between the ability of the processor to address arbitrary stored information and the ability of the memory system to provide it has increased. To address this mismatch, memory systems are typically organized as a hierarchy using caching techniques that are well understood in the art.

In general, caches can be used to reduce average latency problems when accessing (e.g., reading or writing) main memory. A cache is typically a small, specially configured, high-speed memory that represents a small portion of the information represented in main memory. By placing the cache (small, relatively fast, expensive memory) between main memory (large, relatively slow memory) and the processor, the memory system as a whole system is able to satisfy a substantial number of requests from the processor at the speed of the cache, thereby reducing the overall latency of the system. Some systems may define multiple levels of cache.

When the data requested by the processor is in the cache (known as a "hit"), the request is satisfied at the speed of the cache. However, when the data requested by the processor is not in the cache (known as a "miss"), the processor must wait until the data is provided from the slower main memory, resulting in greater latency. Typically, useful work is stalled while data is supplied from main memory. As is well known in the art, the frequency of cache misses is much higher in some applications or execution runs than in others. In particular, accesses for some database systems tend to miss in the cache with higher frequency than some scientific or engineering applications. In general, such variation in cache miss frequencies can be traced to differing spatial and temporal locality characteristics of the memory access sequences. In some scientific or engineering applications, particularly those characterized by array accesses, hardware techniques can be employed to predict subsequent accesses. However, in many applications, it is difficult for hardware to discern and predict memory access sequences.

To increase the likelihood of cache hits and thereby improve apparent memory access latency, some computer systems define instructions for prefetching data from memory to cache. The assumption is that software (e.g., either the programmer or a compiler) may be in a better position to identify prefetch opportunities. To this end, some instructions set architectures such as the SPARC® V9 instruction set architecture support software prefetch instructions. SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems.

Effective use of prefetch instructions is often difficult. Indeed, access patterns for many applications, including database applications, often include chains of successive dependent accesses where, in general, no spatial locality can be presumed. For example, consider the following instruction sequence:

```
LD [R21], R22
LD [R22], R23
LD [R23], R24
``` in which successive loads each depend on address values loaded by a prior instruction. These chains of successive dependent accesses are commonly known as address chains. These and other sources of dependency tend to complicate the use of prefetch techniques.

As a result, prefetch instructions are often not used at all, or are used with little or no intelligence, adding little in the way of added performance. Because the level of knowledge concerning the processor and its memory, which is typically required for effective use is substantial, use of prefetch instructions is generally left to compilers. For compilers or other code preparation facilities to effectively use prefetch instructions, techniques are needed whereby prefetches may be placed to improve overall memory access latency. Techniques that hide memory access latency of addressing chains are particularly desirable. Further, while memory access latencies and placement of prefetch instructions provide a useful context for development of latency hiding techniques, more generally, techniques are desired whereby pre-executable portions of operations (including prefetch instructions) may be placed to improve overall latency in instruction sequences that include operations that are likely to stall. In short, load instructions and prefetch operations are but one example of a more general problem for which solutions are desired.

SUMMARY

It has been discovered that operations (including inserted prefetch operations) that correspond to addressing chains may be scheduled above memory access operations that are likely-to-miss, thereby exploiting latency of the "martyred" likely-to-miss operations and improving execution performance of resulting code. More generally, certain pre-executable counterparts of likely-to-stall operations that form dependency chains may be scheduled above operations that are themselves likely-to-stall. Techniques have been developed to perform such scheduling. In particular, techniques have been developed that allow scheduled pre-executable operations (including prefetch operations and speculative loads) to be hoisted above intervening speculation boundaries. Speculative copies of dependency chains are employed in some realizations. Aggressive insertion of prefetch operations (including some used as markers) is employed in some realizations. Techniques for scheduling operations (e.g., in a compiler implementation) are described. In various realizations, the techniques may be employed to select certain address chains to prefetch, to hide prefetch latency for the address chain prefetching code, and/or to transform code.

BRIEF DESCRIPTION OF THE DRAWINGS

The present invention may be better understood, and its numerous objects, features, and advantages made apparent to those skilled in the art by referencing the accompanying drawings.

FIG. 3A illustrates an instruction sequence that defines a pair of addressing chains separated by a speculation boundary. FIG. 3B illustrates a corresponding instruction sequence in which prefetch operations have been inserted and pre-executable portions of certain operations (including prefetches and speculative loads) have been scheduled above martyr operations (martyr loads in the illustrated example) to hide latency in accordance with some embodiments of the present invention.

The use of the same reference symbols in different drawings indicates similar or identical items.

DESCRIPTION OF THE PREFERRED EMBODIMENT(S)

The description that follows presents a set of techniques, systems, objects, instruction sequences and data structures associated with preparation of code in which some latencies are at least partially hidden. An exemplary realization focuses on memory access latencies of load instructions and on scheduling of corresponding pre-executable prefetch instructions and speculatively executable (non-faulting) load instructions available on implementations of the SPARC processor architecture. Cache misses are the most significant stall condition for such instructions. However, more generally, techniques of the present invention may be applied to code that includes other instructions or operations likely to stall a processor or portion thereof. In general, the relevant set of likely-to-stall instructions or operations is processor implementation dependent. Similarly, the relevant set of pre-executable instruction or operation portions is also dependent on particular processor implementations. Prefetch operations and speculatively executable non-faulting load operations are but two examples.

As a general matter, sequences of instructions or operations often define dependency chains. For example, data loaded or computed by a given instruction may be used as address, or in the formation of an address, for a subsequent memory access instruction. However, more generally, dependencies may exist between other instructions and create dependency chains whether data or control flow related. Some dependencies are created by speculation boundaries.

To provide a reasonably precise descriptive context, the examples that follow focus on likely-to-miss load instructions, prefetch and non-faulting load instructions as pre-executable counterparts, dependency chains created by address data dependencies between successive loads and speculation boundaries that trace to control flows such as branches. Nonetheless, based on the description herein, persons of ordinary skill in the art will appreciate other realizations, including systems, methods, techniques and code prepared in accordance therewith, which employ the constructs and techniques described herein to other sets of likely to stall instructions or operations, pre-executable counterparts, dependency chains and speculation boundaries. Accordingly, in view of the above, and without limitation specific exemplary exploitations are now described.

Figure 1:
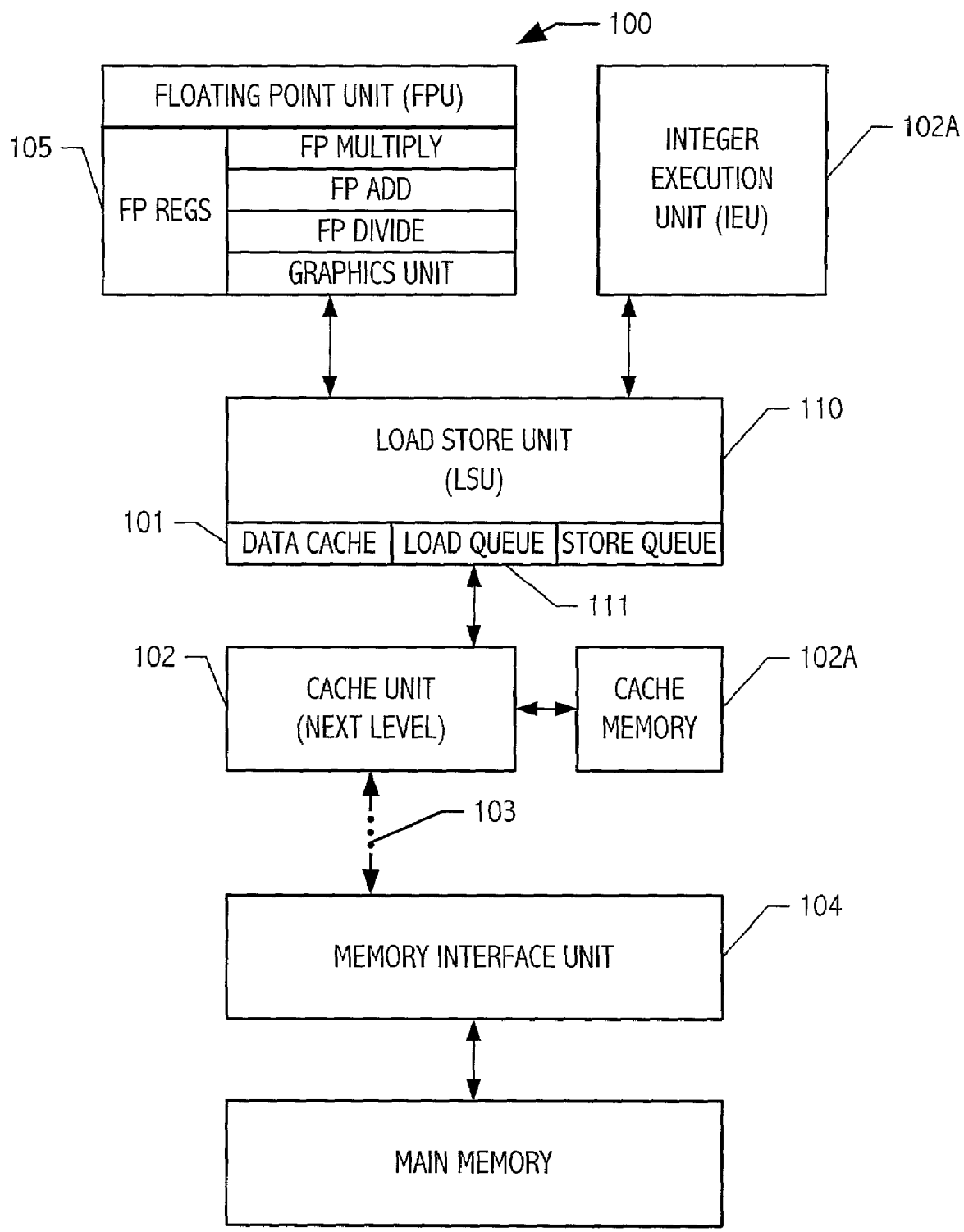
FIG. 1 depicts functional units of an illustrative processor architecture including a memory hierarchy for which some latencies may be at least be partially hidden using techniques and/or code in accordance with some embodiments of the present invention.

FIG. 1 depicts functional units of an illustrative processor 100 that includes a memory hierarchy for which some latencies may be at least be partially hidden using techniques and/or code in accordance with some embodiments of the present invention. Of note, the memory hierarchy of processor 100 includes an on-board data cache 1101 associated with a load/store unit 110 of the processor as well as a next level cache 102, 102A, main memory 104 and any intervening levels 103 (not specifically shown) of additional cache or buffering. In the illustrative context of FIG. 1, instructions likely to stall the processor include memory access instructions (e.g., loads and stores) as well as certain multi-cycle floating point operations executed by floating point unit 105.

Figure 2:
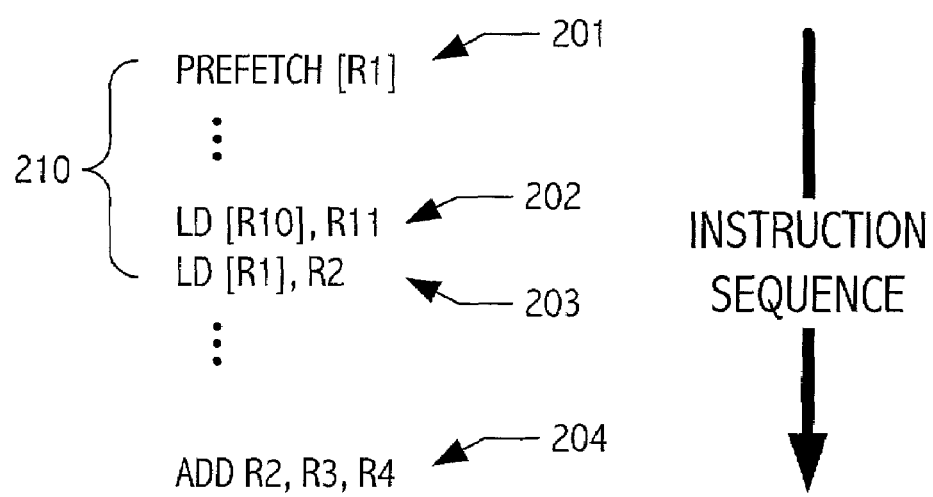
FIG. 2 is an illustrative instruction sequence in which memory access latency of one or more operations, including a prefetch operation, is hidden in the memory access latency of a martyr load operation.

FIG. 2 illustrates an instruction sequence executable by processor 100, which includes a prefetch operation whose memory access latency is hidden in the latency of a load instruction that misses in cache and therefore functions as a "martyr operation," giving itself (or more precisely, its memory access latency) to cover others. In particular, the instruction sequence includes a prefetch instruction 201 that feeds a subsequent load instruction 203 by moving data into one of the caches. In a memory hierarchy such as illustrated in FIG. 1, memory access latency may be substantial, perhaps 120 cycles or more, for accesses that do not resolve in cache, but which instead must be serviced from main memory 104. Accordingly, for prefetch instruction 201 to obtain data addressed by contents of register R1 in time to allow load instruction 203 to execute without data dependency delay, then prefetch instruction 201 must precede load instruction 203 by a latency at least equal to the memory access latency (e.g., 120 cycles or more). Unfortunately, it is often difficult for a compiler to place a prefetch instruction so far ahead of the instruction that it is placed to feed. Intervening control flows and dependencies of a prefetch address on preceding instructions or operations generally make it impractical to schedule of a prefetch instruction at a position in program code that precedes the fed instruction by the full memory access latency.

However, by identifying (e.g., during scheduling) instructions that are likely to stall (e.g., likely-to-miss memory access instruction such as load instruction 202), a compiler may opportunistically place a prefetch instruction in position ahead of one or more such instructions that act as martyrs. In the example of FIG. 2, load instruction 202 acts as a martyr and allows placement of prefetch instruction 201 sufficiently ahead of the load instruction 203 that it feeds. While prefetch instruction 201 sufficiently precedes load instruction 203 in time, it need not be displaced so far (in instruction positions) as to suffer from problems associated with intervening control flow instructions and data dependencies. Indeed, prefetch instruction 201 may be placed in an instruction position that immediately precedes the martyr load instruction 202, i.e., a mere two instruction positions before. Accordingly, instruction displacement 210 can be manageably small.

Unfortunately, the example of FIG. 2 simplifies some of the challenges that exist for compiler placement of prefetch instructions. In particular, many instruction sequences tend to include dependency chains such as address dependencies encountered in the access of pointer-based or recursive data structures. Placement of prefetch instructions is more difficult in such cases. However, techniques in accordance with some embodiments of the present invention offer compilers and other code preparation facilities an opportunity for efficient generation of prefetch instructions for address chains such as those encountered in the traversal of pointer-based or recursive data structures. Compilers and other code preparation facilities may be embodied in a computer program product that is encoded in one or more computer readable media. A computer readable media may be selected from the set of a disk, tape or other magnetic, optical, semiconductor or electronic storage medium. A compiler or other code preparation facility may also be encoded in a network, wireline, wireless, or other communications medium.

Figures 3A, 3B:
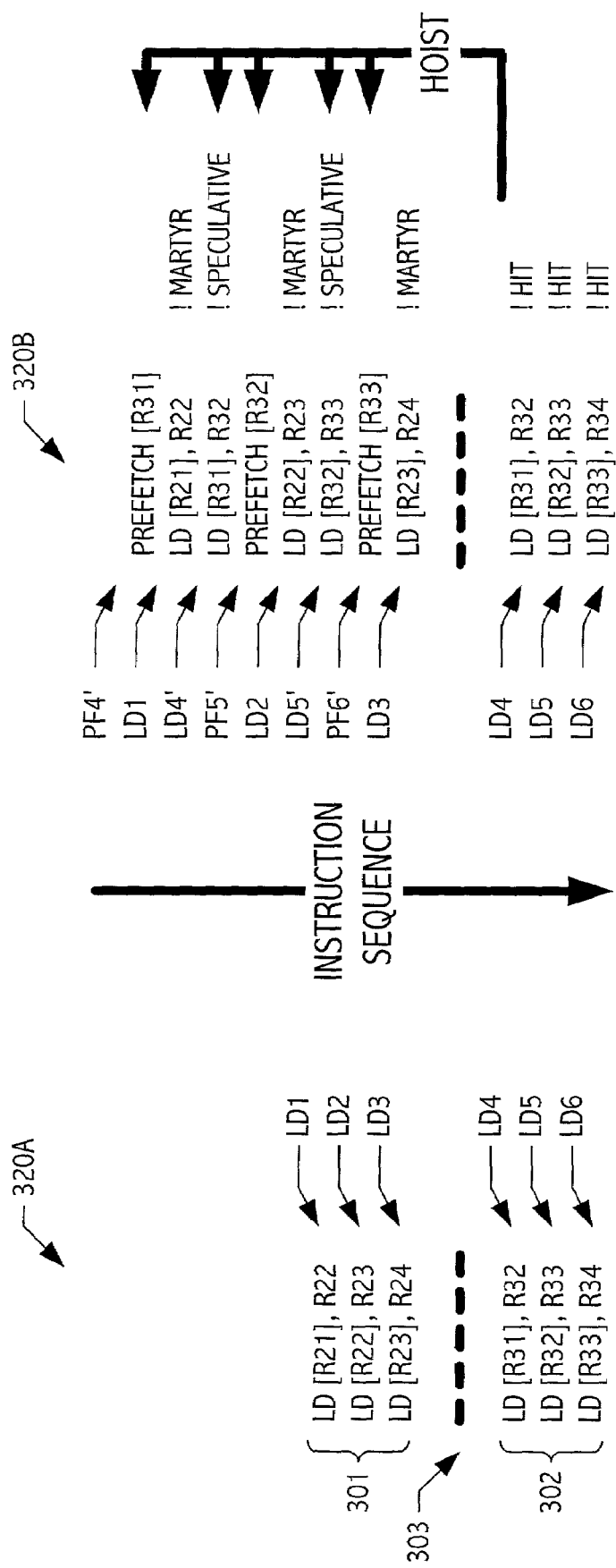
FIGS. 3A and 3B are illustrative instruction sequences in which latency hiding techniques in accordance with some embodiments of the present invention are applied to one illustrative class of dependent operation chains, namely chains of operations that exhibit address data dependencies. In particular.

FIGS. 3A and 3B depict an illustrative sequence of instructions in which address data dependencies of successive load instructions complicate prefetch scheduling. In particular, FIG. 3A illustrates an instruction sequence 320A in which a pair (301, 302) of addressing chains is separated by a speculation boundary 303. Of note, successive load instructions depend on the result of a preceding load instruction. More particularly, load instruction LD3 uses (as an address) the result obtained by preceding load instruction LD2, which, in turn, uses the result obtained by preceding load instruction LD1. Similarly, load instruction LD6 uses the result obtained by preceding load instruction LD5, which, in turn, uses the result obtained by preceding load instruction LD4. Speculation boundary 303, which may correspond to a branch operation, store operation or other operation (not shown) that has at least one irreversible side-effect defines an additional dependency upon which instructions that follow, e.g., load instructions LD4, LD5 and LD6, depend.

In addition to the particular address data dependencies illustrated, a dependency may take the form of an alias dependency, and implicit data dependency or some other dependency. An alias dependency is when two pointers may point to the same memory location. An implicit data dependency is present when one variable determines if another variable is valid. For example, in the pseudocode below, validity of the value stored in a location identified by pointer depends on the predicate, valid.

```
if (valid) {
    *pointer++;
} else
    return;
}
```

FIG. 3B illustrates a corresponding instruction sequence 320B in which prefetch operations have been inserted and pre-executable portions of certain operations (including prefetches and speculative loads) have been scheduled above martyr operations (martyr loads in the illustrated example) to hide latency. In the illustrated instruction sequence, prefetches and speculative loads (e.g., prefetch instructions PF4', PF5' and PF6' and load instructions LD4' and LD5') may be viewed as associated with corresponding instructions of the second dependency chain and hoisted into position or merely scheduled appropriately. Whatever the descriptive framework, pre-executable operations are scheduled in such a way as to dramatically reduce overall memory access latency of the instruction sequence. In particular, instruction sequence 320B reduces by up to one half (½) the overall memory access latency as compared to that of instruction sequence 320A. Load instructions LD4, LD5 and LD6 are likely to hit in the cache due to corresponding pre-executed prefetch and speculative load instructions whose latency was hidden in that of corresponding martyr load instructions of the first address chain. For example, load instruction LD3 is a martyr, expected to miss in the cache, and hides memory access latency for speculative load instruction LD5' and prefetch instruction PF6'.

Persons of ordinary skill in the art will recognize that additional instructions may be scheduled to exploit the memory access latency of the martyr load instructions. Indeed, pre-executable instructions corresponding to other dependency chains, whether above or below speculation boundary 303 may be similarly scheduled. Indeed, in the particular load and prefetch dominated example described, it is generally desirable to schedule as many pre-executable instructions as available, up to the capacity of a memory or prefetch queue (e.g., in the illustrative architecture of FIG. 1, up to the capacity of load queue 111). Nonetheless, the exemplary instruction sequences of FIGS. 3A and 3B provide a useful context in which to describe a technique for scheduling instructions in which some dependency chain latencies are hidden by scheduling corresponding pre-executable instructions above instructions that are likely-tostall, thereby exploiting latency of the "martyred" likely-to-stall instructions and improving execution performance of resulting code.

In the drawings that follow, reference characters (e.g., LD1 and PF4) are used as shorthand for the corresponding instructions shown in FIGS. 3A and 3B. In particular, FIGS. 4–8 depict successive intermediate scheduler representations corresponding to instruction sequence 320A (embodied as original code 410) together with instructions scheduled at each stage and eventually resulting in instruction sequence 320B. Intermediate stages are arbitrary. Accordingly, the illustrated stages have been selected mainly for descriptive purposes and need not correspond to any specific stage of execution in any particular implementation of the illustrated techniques. Accordingly, in view of the above and without limitation, application of some techniques in accordance with the present invention is illustrated in the particular descriptive context of a pair of addressing chains separated by a speculation boundary.

Figure 4:
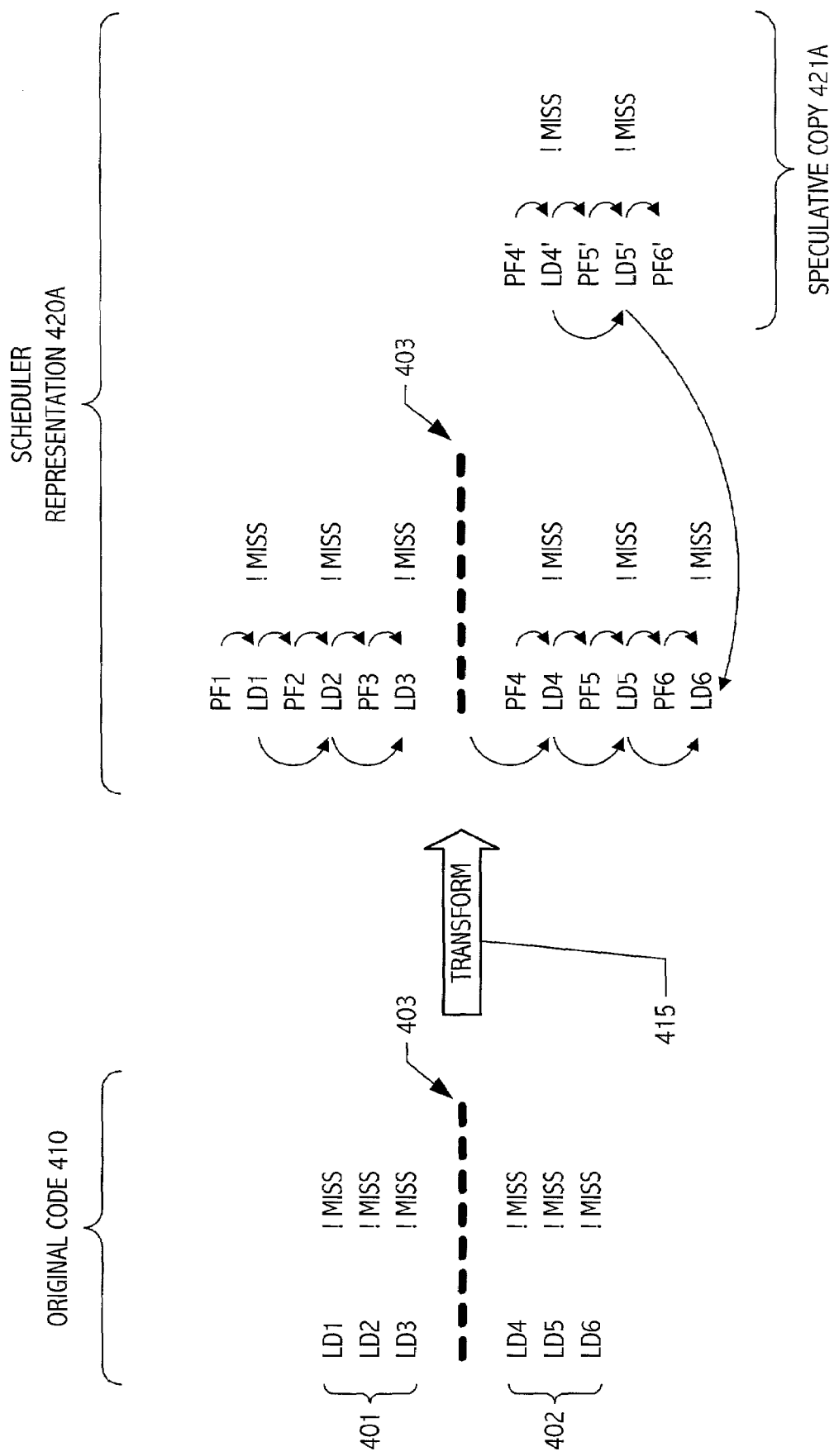
FIG. 4 illustrates transformation of the instruction sequence of FIG. 3A into an intermediate representation employed for scheduling instructions some embodiments of the present invention. The intermediate representation includes aggressively inserted prefetch operations, encodes dependencies and includes a speculative copy of one of the illustrated chains of operations.

FIG. 4 illustrates transformation of the instruction sequence of FIG. 3A into an intermediate representation employed for scheduling instructions. The intermediate representation includes aggressively inserted prefetch instructions, encodes dependencies and includes a speculative copy of one of the illustrated chains of operations. In particular, respective prefetch instructions have been inserted into scheduler representation 420A, which corresponds to original code 410, for each likely-to-miss load instructions. For example, prefetch instruction PF1 has been inserted to (potentially) obtain data to be loaded by load instruction LD1, prefetch instruction PF2 has been inserted to (potentially) obtain data to be loaded by load instruction LD2, and similarly for respective load instructions LD3, LD4, LD5 and LD6. Likely-to-miss instructions may be identified using any of a variety of techniques including profile-feedback from execution of an executable corresponding to the original code, heuristics (e.g., heuristics that guess that all local variables hit in the cache, but global and indirect references miss), etc.

Scheduler representation 420A encodes dependencies between instructions. For example, load instruction LD5 depends on address data loaded by load instruction LD4, and load instruction LD4, in turn, depends on speculation boundary 403 (e.g., a store or control transfer instruction that must be completed or retired before instructions of the second address chain can execute non-speculatively). In addition, load instruction LD5 depends on prefetch instruction PF5, which in turn, depends on address data loaded by load instruction LD4, which in turn, depends on prefetch instruction PF4. Other dependencies encodes are similar and will be understood in the context of the FIG. 4. In addition to an original dependency chain, scheduler representation 420A includes a speculative copy 421A that will be used in the scheduling of speculative counterparts of instructions from the original dependency chain. In the description that follows, speculative counterparts are indicated using notation of the form <op><number>', e.g., prefetch operation PF4', which corresponds to <op><number>, e.g., prefetch operation PF4. In the illustration of FIG. 4, a single dependency chain leading to a cache miss (i.e., leading to likely-to-miss load instruction LD6) is duplicated. However, more generally, multiple dependency chains may exist that lead to respective likely-to-stall instructions. Accordingly, in more complex instruction sequences, multiple dependency chains may exist and a speculative copy of each may be prepared.

Any of a variety of data structure encodings may be employed, including as nodes of a directed acyclic graph representation. The use below of a discrete copy of certain subsequences of instructions is merely a useful descriptive tool. Indeed, compiler or other code preparation implementations in accordance with the present invention may employ other conventional methods for representing such duplicate chains of instructions, including as modifying attributes for data representations of original chains.

Figure 5:
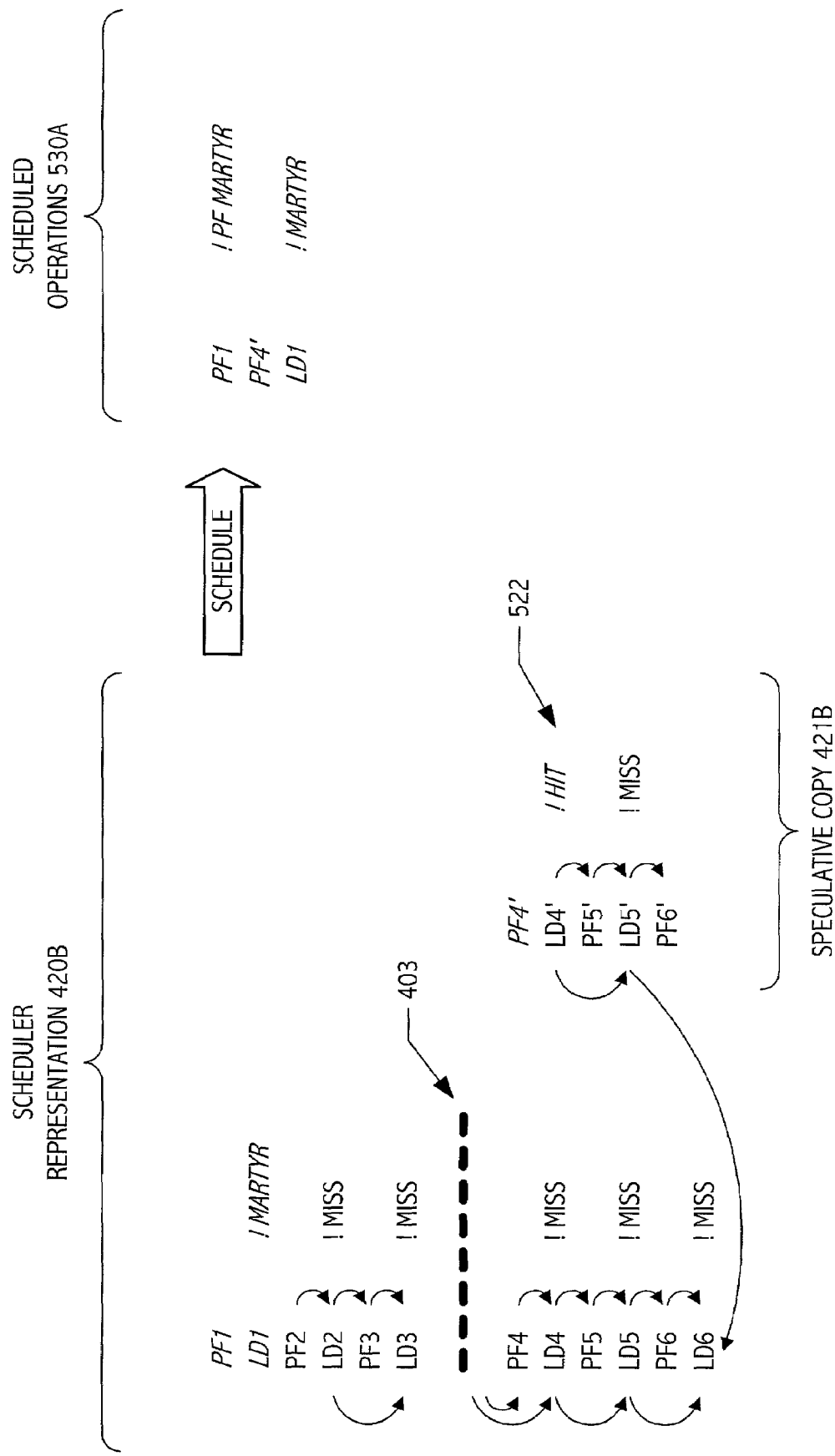
FIGS. 5, 6 and 7 illustrate, based on the instruction sequence of FIG. 3A, successive illustrative states for intermediate representations of instruction dependencies and scheduled code employed in some embodiments of the present invention.
Figure 6:
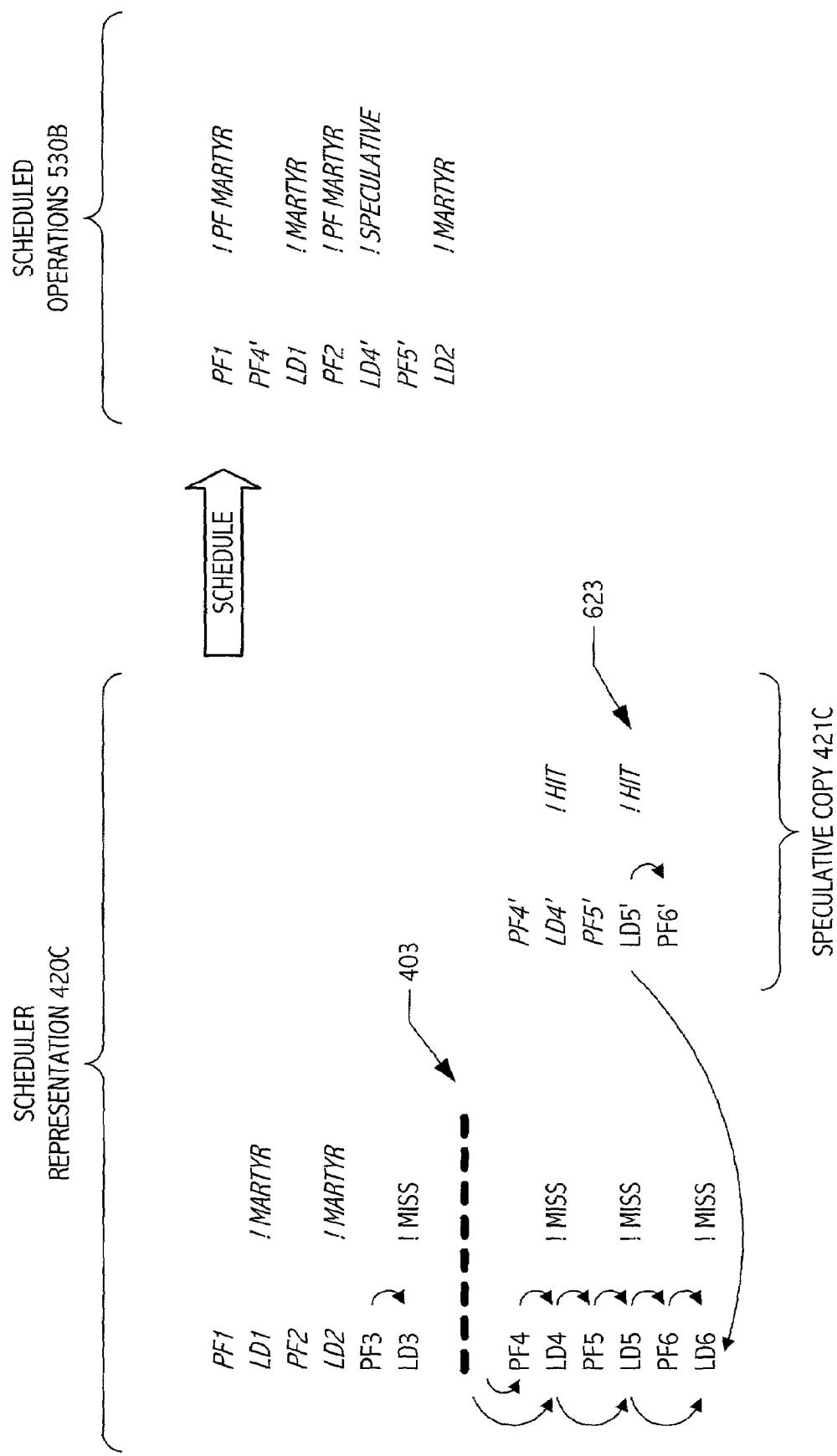
Figure 7:
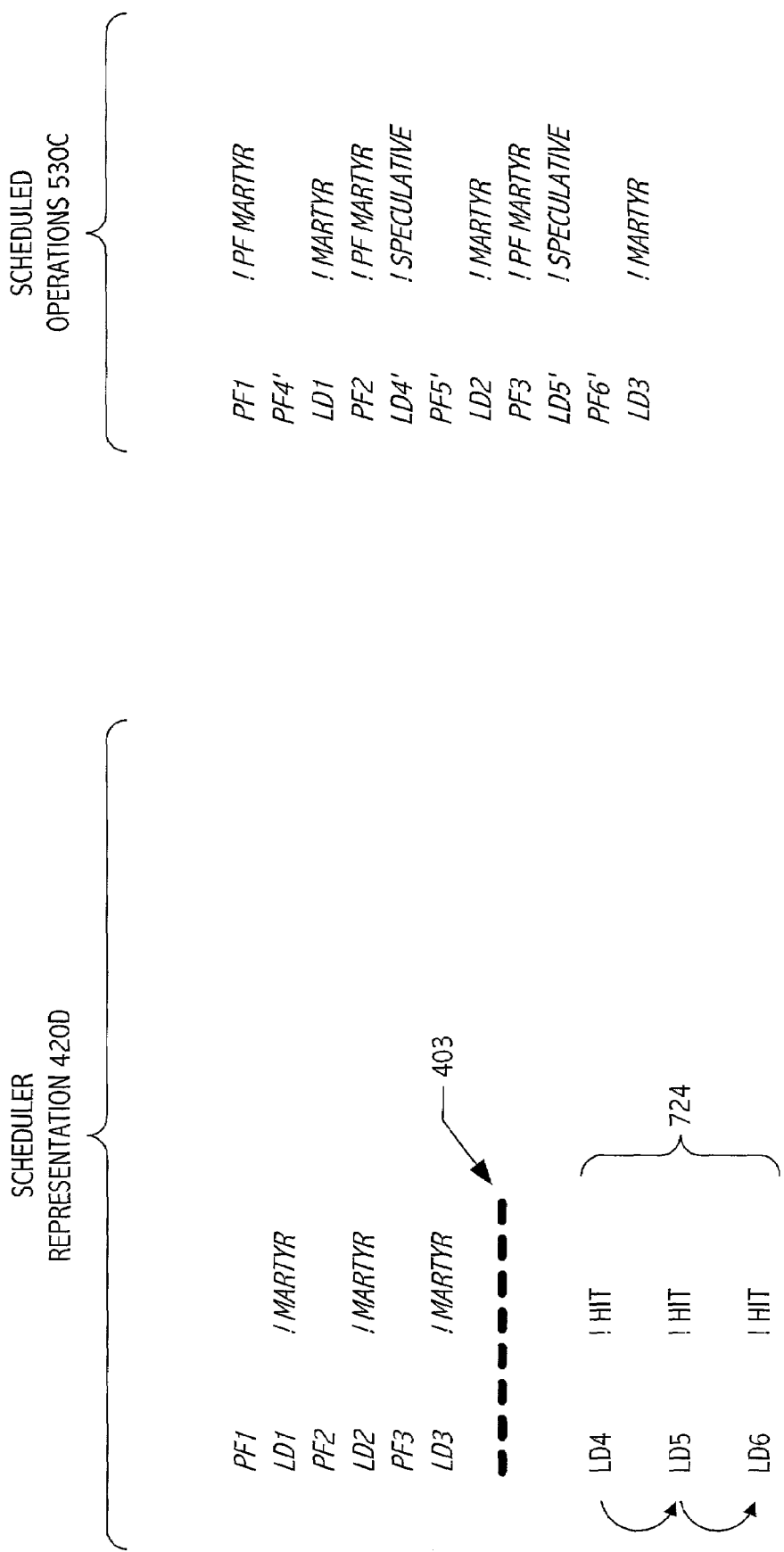

FIGS. 5, 6 and 7 illustrate, based on the instruction sequence of FIG. 3A and using the above-described initial state of scheduler representation 420A, successive illustrative states for intermediate representations of instruction dependencies and scheduled code. Focusing first on FIG. 5, instructions are scheduled according to a process described in greater detail, below. However, for present purposes, the following heuristics are applied with particular attention to load and prefetch instructions:

1. When a prefetch instruction is encountered, which is ready to be scheduled, determine whether it "feeds" a memory load operation that would make a good "martyr load" to hide cache miss latency for other prefetches. Mark these prefetches that feed martyr loads as "prefetch martyrs" or "martyr place holders." When there is a choice amongst multiple prefetch instructions, choose the one with the highest "memory height," i.e., the longest chain of dependent memory operations to the end of a scheduling unit of code.
2. Schedule as many prefetch instructions as possible between the prefetch martyr and the martyr load, without including any instructions that are likely to stall.
3. Mark instructions fed by scheduled prefetch instructions as not likely to miss (e.g., as cache hits) since they have been prefetched.

Such heuristics, or operations implementing the functionality thereof, may be integrated with other heuristics or operations appropriate to the larger context of a compiler or other code preparation facility. Such other heuristics or operations are, in general, implementation dependent and those suitable for a particular implementation will be appreciated by persons of ordinary skill in the art. The description that follows focused on those aspects of instruction scheduling which are particular to the latency hiding technique and illustrative instruction sequences.

Applying the above-described heuristics, a compiler or other code preparation facility identifies load instruction LD1 as a martyr load fed by prefetch instruction PF1. Accordingly, we attempt to schedule prefetch instructions between prefetch instruction PF1 and load instruction LD1. None of the prefetch instructions of the first dependency chain and none of the instructions of the non-speculative representation of the second dependency chain are ready to be scheduled. However, the first instruction of the speculative copy, namely prefetch instruction PF4', is ready since (as a speculative copy) dependence on speculation boundary 403 is relaxed. Accordingly, prefetch instruction PF' is scheduled in position to take advantage of the memory access latency of load instruction LD1. Because prefetch instruction PF4' has been scheduled, the load instruction LD4' is no longer likely to miss and is therefore marked (522) as a cache hit.

At the end of an exemplary first stage of scheduling illustrated in FIG. 5, intermediate states correspond to scheduler representation 420B and scheduled operations 530A. Of course, as explained earlier, the exemplary first stage of scheduling illustrated in FIG. 5 need not correspond to any particular execution stage in any particular implementation. Rather, FIG. 5 provides a useful descriptive context for understanding. In general, scheduled instructions may be deleted from scheduler representation 420B or simply marked as scheduled. For descriptive purposes, scheduled instructions are shown in FIG. 5 in italic font.

FIG. 6 illustrates results of additional scheduling. As before, a load instruction (load instruction LD2) is identified as a martyr load fed by a prefetch instruction (prefetch instruction PF2). Accordingly, we attempt to schedule prefetch instructions between prefetch instruction PF2 and load instruction LD2. None of the prefetch instructions of the first dependency chain and none of the instructions of the non-speculative representation of the second dependency chain are ready to be scheduled (see FIG. 5). However, one instruction of the speculative copy is ready, namely load instruction LD4' (which is a pre-executable speculative counterpart of load instruction LD4). Accordingly, load instruction LD4' is scheduled as a speculative operation, which in turn readies prefetch instruction PF5'. On SPARC processors, the speculative loads are implemented with non-faulting loads. Other architectures provide similar facilities to create speculative loads. Next, prefetch instruction PF5' is scheduled. Both load instruction LD4' and prefetch instruction PF5' are scheduled in position to take advantage of the memory access latency of load instruction LD2. Because load instruction LD4' and prefetch instruction PF5' have been scheduled, load instruction LD5' is no longer likely to miss and is therefore marked (623) as a cache hit. At the end of the exemplary stage of scheduling illustrated in FIG. 6, intermediate states correspond to scheduler representation 420C and scheduled operations 530B. As before, the exemplary stage of scheduling illustrated in FIG. 6 need not correspond to any particular execution stage in any particular implementation.

FIG. 7 illustrates results of further scheduling. As before, a load instruction (load instruction LD3) is identified as a martyr load fed by a prefetch instruction (prefetch instruction PF3). Accordingly, we attempt to schedule prefetch instructions between prefetch instruction PF3 and load instruction LD3. Again, none of the prefetch instructions of the first dependency chain and none of the instructions of the non-speculative representation of the second dependency chain are ready to be scheduled (see FIG. 6). However, one instruction of the speculative copy is ready, namely load instruction LD5' (which is a pre-executable speculative counterpart of load instruction LD5). Accordingly, load instruction LD5' is scheduled as a speculative operation, which in turn readies prefetch instruction PF6'. Next, prefetch instruction PF6' is scheduled. Both load instruction LD5' and prefetch instruction PF6' are scheduled in position to take advantage of the memory access latency of load instruction LD3.

The illustrative scheduling state of FIG. 7 includes several additional changes. First, because all of the instructions available to be scheduled in the window between prefetch instruction PF3 and load instruction LD3 have, in fact, been scheduled, speculation boundary 403 is reached and instructions of the second dependency chain are no longer treated as speculative. For simplicity of illustration, the scheduling of any instructions associated with speculation boundary 403 (e.g., a control flow branch, join, aliased store operation, etc.) is not shown. However, in general, once a speculation boundary has been reached and corresponding operations have been scheduled, remaining unscheduled instructions from speculative copies may be deleted. More particularly, if the original version of a copied instruction is no longer speculative (i.e., if the copied instruction is no longer blocked from scheduling by a speculation boundary), then the corresponding copy and any subsequent copied portion of a dependency chain is deleted. Furthermore, non-speculative prefetches corresponding to prefetch instructions speculatively scheduled from the speculative copies of any dependency chains are deleted. Accordingly, in the preceding illustration, prefetch instructions PF4, PF5 and PF6 (for which corresponding speculative prefetch instructions PF4', PF5' and PF6' have been scheduled) are deleted from scheduler representation 420D as illustrated by remaining instructions 724. Deletion of original prefetch instructions may be performed coincident with scheduling of speculative counterparts in some implementations.

Because load instruction LD5' and prefetch instruction PF6' have been scheduled, load instruction LD6' is no longer likely to miss and is therefore marked as a cache hit. Indeed, as described above, since corresponding prefetch instructions have been scheduled, all of remaining instructions 724 are cache hits. At the end of an exemplary stage of scheduling illustrated in FIG. 7, intermediate states correspond to scheduler representation 420D and scheduled operations 530C.

Figure 8:
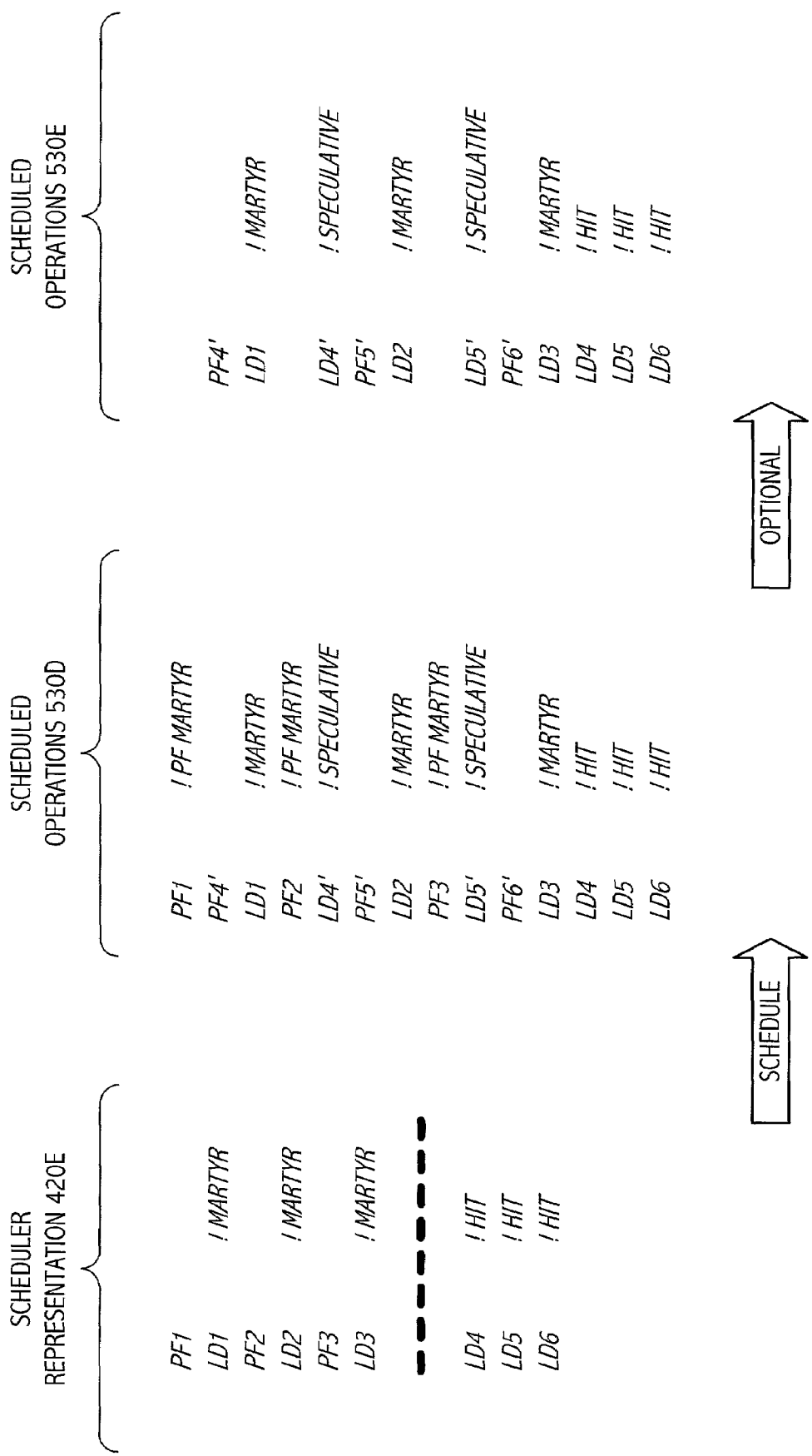
FIG. 8 illustrates states for intermediate representations of instruction dependencies and scheduled code that correspond to the desired resultant code illustrated in FIG. 3B.

FIG. 8 illustrates results of further scheduling. In particular, load instruction LD4 is ready for scheduling and is so scheduled. As a result, the remaining dependency relationship for load instruction LD5 (i.e., on load instruction LD4, see FIG. 7) is satisfied and it too is scheduled. Similarly, the remaining dependency relationship for load instruction LD6 (i.e., on load instruction LD5) is satisfied and load instruction LD6 is scheduled, all as shown in scheduled operations 530D. At this stage, prefetch martyrs (i.e., prefetch instruction PF1', prefetch instruction PF2' and prefetch instruction PF3') may be deleted from the resultant code as shown in scheduled operations 530E. Alternatively, prefetch martyrs (sometimes known as martyr placeholders) may be preserved to mark windows into which additional instructions may be inserted (e.g., by later stages of compiler optimization) to exploit the latency hiding opportunities presented by corresponding martyr operations.

Figure 9:
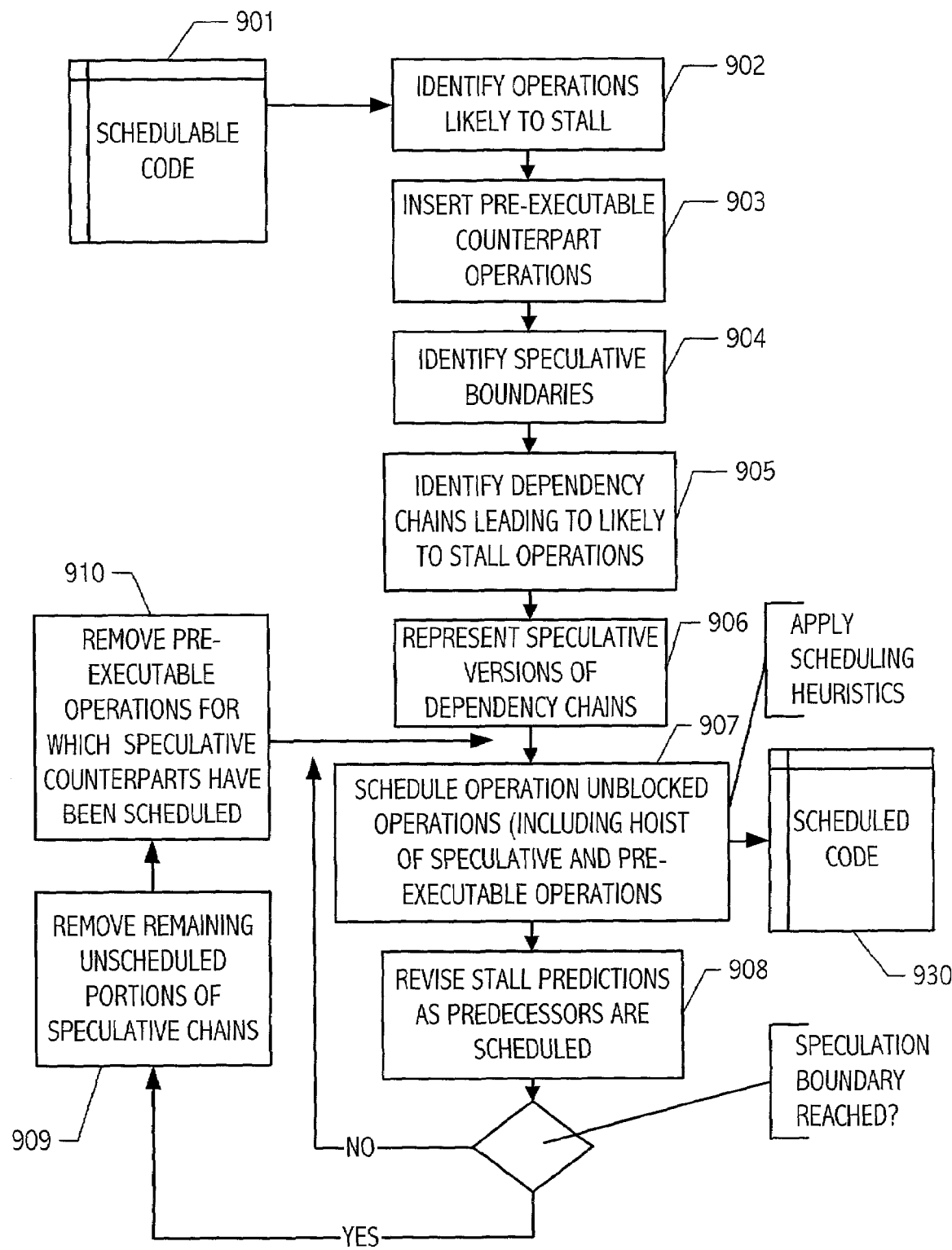
FIG. 9 is a flow chart of operations whereby schedulable code is transformed to hide latency in accordance with some embodiments of the present invention.

The preceding sequence of intermediate scheduling results may also be understood in the context of FIG. 9. FIG. 9 is a flow chart of operations (e.g., performed by a compiler or other code preparation system) whereby schedulable code is transformed to hide latency. In general, schedulable code 901 is any code for which instruction scheduling is possible. In the context of implementation that provide memory access latency hiding, memory operations should be explicit. In some realizations, schedulable code may be compiled from a source program into an intermediate form employed by the compiler or code preparation. In others, e.g., in just-in-time (JIT) compiler exploitations, the schedulable code may be code executable by a target processor for which run-time optimizations may be performed using techniques described herein.

Whatever the nature of schedulable code 901, instructions (or more generally, operations) that are likely to stall the target processor (or a pipeline of execution unit thereof) are identified (902). The code preparation of FIGS. 4–8 emphasized load instructions that were likely to miss in cache; however, more generally, other likely-to-stall operations may be identified. For example, without limitation, the first use of a load operation, store operations, branch operations, multi-cycle computational operations (e.g., floating point operations), repetitive operations, communications operations, input/output (I/O) operations, synchronization operations and/or co-processor operations may provide latency hiding opportunities in a particular implementation.

For at least some operations or instructions that can stall, certain instances and executions thereof may stall and others may not. In general, likely-to-stall instructions or operations may be identified using any of a variety of techniques including profile-feedback from execution of an executable corresponding to the original code, heuristics (e.g., heuristics that guess that all local variables hit in the cache, but global and indirect references miss), etc.

Pre-executable counterpart operations are inserted (903) into a representation of the schedulable code. Any of a variety of representations are possible and will, in general, be a function of the particular implementation environment. Pre-executable operations are counterparts of respective likely-to-stall operations. The code preparation of FIGS. 4–8 emphasized prefetch operations that were counterparts to load instructions that were likely to miss in cache; however, more generally, other pre-executable counterpart operations may be inserted. In the case of a prefetch instruction, the pre-executable portion of a corresponding load instruction is the movement of data from memory to cache. Other likely-to-stall operations may have schedulable pre-executable portions. In general, pre-executable portions exhibit two important properties. First, they should cause no irreversible side-effects to program state and are therefore speculatively executable. Second, a useful pre-executable portion has the property that its successful execution reduces or eliminates the execution stall for subsequent execution of the complete operation (i.e., there is some caching or execution setup effect).

Speculative boundaries are identified (904). In general, any of a variety of scheduling techniques may be employed to identify scheduling units and perform instruction or operation scheduling. For the exemplary implementations described herein, program code is partitioned into traces, and trace scheduling techniques are employed in an overall scheduling framework. Other scheduling frameworks may be employed and suitable application of the techniques described herein will be appreciated by persons of ordinary skill in the art. In general, speculation boundaries may be defined by a store operation, a branch operation, a join operation, an iterative or recursive operation, a communications operation, an input/output (I/O) operation, a synchronization operation, a co-processor operation, etc.

Given the identification of likely-to-stall instructions or operations and the identification of speculative boundaries, dependency chains are identified (905). The code preparation of FIGS. 4–8 emphasized address-type dependencies; however, more generally, other sources of dependency may be identified. For example, even in the context of memory access instructions, address forming operations (e.g., base+offset calculations, etc.) may be part of a given dependency chain. More generally, any operation necessary to prepare for the execution of a likely-to-stall operation, up to and including any pre-executable portion thereof can be part of a dependency chain.

Speculative versions of the identified dependency chains are represented (906) next. In the code preparation previously described, speculative copies of the dependency chains were represented in a directed acyclic graph data structure representation; however, other representations may be suitable for other implementations. For example, speculative chains may be implicitly coded (e.g., using a speculative version field in an instruction node of a scheduler data structure) as part of a representation of schedulable instructions or operations and original dependency chains there- through. Whatever the particular underlying representation, original and speculative counterparts are presented to the scheduler algorithm.

Next, available instructions or operations are scheduled (907) using algorithms, methods or heuristics implemented by a particular compiler or code preparation tool. Scheduling techniques are well understood in the art and modifications and/or extension to support latency hiding techniques in accordance with the present invention will best be understood as a set of additional scheduling considerations or heuristics that may be folded into an existing scheduler framework. These scheduling considerations or heuristics include:

1. When a pre-executable operation is encountered, which is ready to be scheduled, determine whether it "feeds" an operation that would make a good "martyr" to hide stall latency for other pre-executable operations. Mark these pre-executable operations that feed martyrs as "martyr place holders."
2. When there is a choice amongst multiple pre-executable operations, choose the one with the longest chain of dependent operations to the end of a scheduling unit of code, especially the longest chain of like-to-stall operations.
3. Schedule as many pre-executable operations as possible between the martyr place holders and the martyr, without including any instructions that are likely to stall.
4. When scheduling, generally prefer non-speculative operations to speculative operations (e.g., prefer non-speculative prefetches to speculative prefetches) and prefer pre-executable portions to speculative counterpart operations (e.g., prefer prefetches to speculative loads).
5. When scheduling a memory access instruction, consider the possibility that other memory access targets are represented in the same cache line.

Continue scheduling until a speculation boundary is reached, revising (908) stall predictions based for instructions or operations fed by scheduled pre-executable operations. In particular, certain instructions or operations should no longer be considered likely to stall since respective pre-executable portions will have been executed.

If a scheduling boundary is reached, remaining unscheduled portions of speculative chains are removed (909) from the operative scheduler representation. In addition, pre-executable operations for which speculative counterparts have been scheduled may also be removed (910) at this time. Alternatively, such removal may be performed incrementally in some implementations (e.g., coincident with scheduling of the speculative counterpart). Instructions or operations for additional scheduler blocks are similarly processed with scheduled code 930 accumulating in an appropriate data store. For optimizing compiler implementations, scheduled code 930 may be an executable or intermediate representation for which optimization or additional processing may be performed.

While the invention has been described with reference to various embodiments, it will be understood that these embodiments are illustrative and that the scope of the invention is not limited to them. Many variations, modifications, additions, and improvements are possible. For example, while much of the description herein has focused on the illustrative context of likely-to-miss load instructions, address-type dependency chains and insertion of counterpart pre-executable prefetch instructions to exploit memory access latency provided by some of the likely-to-miss load instructions that act as martyrs, applications to other likely-to-stall instructions or operations, to other sources of dependency and to other pre-executable portions of likely-to-stall instructions or operations are all envisioned. Similarly, although instruction scheduling has been presumed, techniques described herein may be more generally applied to operations of processor, pipeline or execution unit, whether such operations correspond one-to-one with instructions of an instruction set or are lower-level or higher-level operations performed by a particular implementation of a target architecture. For example, based on the description herein, persons of ordinary skill in the art will appreciate extensions to operations executable by a microcoded processor implementation or virtual machine implementation.

In general, a variety of different kinds of prefetch instructions or operations may be defined in any given processor implementation. For example, some processor architectures support prefetching of data into different or specified levels of cache. Accordingly, use of such prefetch operations will have differing effects on the subsequent latencies of loads and on the subsequent cache hits/misses of those levels of the cache system. Based on the description herein, persons of ordinary skill in the art will appreciate suitable adaptations to match particular prefetch facilities provided in a given processor implementation.

More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. In a scheduler for computer code, which is encoded in one or more computer readable media, wherein certain operations are likely to stall execution of the computer code and thereby provide latency for completion of one or more pre-executable operations, a method of scheduling certain of the operations, the method comprising:
   for one or more sequences of operations that follow a speculation boundary and that define respective dependency chains, including pre-executable operations, which lead to likely stalls, representing speculative copies thereof as duplicate chains; and
   scheduling operations of the computer code, wherein the scheduling of operations from the duplicate chains is performed without regard to dependence of respective original operations on the speculation boundary, thereby scheduling certain of the operations above the speculation boundary into position preceding at least one of the operations likely to stall execution of the computer code.
   wherein the speculation boundary corresponds to an operation upon which the respective original depend.

2. A method, as recited in claim 1,
   wherein the likely stalls include likely cache misses.

3. A method, as recited in claim 1,
   wherein the dependency chains include address chains leading to memory access operations likely to miss in a cache.

4. A method, as recited in claim 1,
   wherein the pre-executable operations include prefetch instructions.

5. A method, as recited in claim 1,
   wherein the pre-executable operations include speculative operations.

6. A method, as recited in claim 1,
   wherein the operations likely to stall execution include memory access instructions.

7. A method, as recited in claim 1, wherein the operations likely to stall execution include operations selected from the set of:
   a load operation;
   first use of a load operation;
   a store operation;
   a branch operation;
   a multi-cycle computational operation;
   an iterative or recursive operation;
   a communications operation;
   an input/output (I/O) operation;
   a synchronization operation; and
   a co-processor operation.

8. A method, as recited in claim 1, wherein the speculation boundary is defined by one of:
   a store operation;
   a branch operation;
   a join operation;
   an iterative or recursive operation;
   a communications operation;
   an input/output (I/O) operation;
   a synchronization operation; and
   a co-processor operation.

9. A method, as recited in claim 1, further comprising:
   inserting the pre-executable operations into the computer code.

10. A method, as recited in claim 1, further comprising:
    profiling the computer code to identify the likely stalls.

11. A method, as recited in claim 1, further comprising:
    upon reaching the speculation boundary, deleting unscheduled operations of the duplicate chains and continuing to schedule respective original operations.

12. A method, as recited in claim 1, further comprising:
    deleting from the original operations, pre-executable operations for which a respective speculative copy is scheduled.

13. A computer implemented method of hiding latency in computer code wherein certain operations thereof are likely to stall execution, the method comprising:
    identifying sequences of operations that define respective original dependency chains that lead to likely stalls and for at least some of the identified sequences, representing duplicate dependency chains thereof; and
    scheduling at least some operations from the duplicate dependency chains above at least one of the likely-to-stall operations,
    wherein the operations scheduled from the duplicate dependency chains are scheduled above a speculation boundary that corresponds to an operation upon which the original dependency chains depend and that precedes the at least some of the identified sequences.

14. The method of claim 13,
    wherein dependency chains are defined at least in part by address dependencies.

15. The method of claim 13, further comprising:
upon reaching a corresponding speculation boundary, removing otherwise unscheduled operations of the duplicate dependency chains.

16. The method of claim 13, wherein the operations likely to stall execution include operations selected from the set of:
a load operation;
first use of a load operation;
a store operation;
a branch operation;
a multi-cycle computational operation;
an iterative or recursive operation;
a communications operation;
an input/output (I/O) operation;
a synchronization operation; and
a co-processor operation.

17. The method of claim 14, wherein the speculation boundary is defined by one of:
a store operation;
a branch operation;
a join operation;
an iterative or recursive operation;
a communications operation;
an input/output (I/O) operation;
a synchronization operation; and
a co-processor operation.

18. The method of claim 14, wherein the speculation boundary is defined by an operation that has irreversible side-effects.

19. The method of claim 13,
wherein the operations likely to stall execution include memory access operations.

20. The method of claim 13, further comprising:
for at least load-type ones of the operations, inserting corresponding prefetch operations.

21. The method of claim 13, further comprising:
converting load-type ones of the scheduled operations to speculative counterpart operations.

22. The method of claim 13, further comprising:
converting load-type ones of the scheduled operations to non-faulting loads.

23. The method of claim 13, further comprising
responsive to the scheduling of a prefetch operation from one of the duplicate dependency chains, disposing of a corresponding prefetch operation from a corresponding one of the original dependency chains.

24. The method of claim 13, further comprising:
selecting for the scheduling, particular ones of the operations from the duplicate dependency chains based at least in part on chain length.

25. The method of claim 13,
wherein the likely to stall operations include memory operations predicted to miss in a cache.

26. The method of claim 13,
wherein the likely to stall operations include store-type operations predicted to miss in a cache.

27. The method of claim 13,
wherein the likely to stall operations include operations that stall an execution pipeline.

28. The method of claim 13,
wherein the dependency chains include load-type and prefetch operations.

29. The method of claim 13,
wherein the dependency chains include operations other than load-type and prefetch operations.

30. The method of claim 13,
wherein the dependency chains include operations involved in address calculations.

31. The method of claim 13,
wherein the duplicate dependency chains are represented as copies of the respective original dependency chains with speculation boundary dependencies removed or ignored.

32. The method of claim 13,
wherein the dependency chains are represented a directed acyclic graph of dependencies amongst the corresponding operations.

33. The method of claim 32, wherein the dependencies include one or more of:
register dependencies;
branch dependencies; and
memory dependencies.

34. The method of claim 13, realized in an optimizing compiler.

35. The method of claim 13, realized in a just-in-time (JIT) compiler.

36. A computer implemented method of making a computer program product that encodes program code for which memory access latency is at least partially hidden on execution thereof, the method comprising:
for operations that form addressing chains that lead to a likely cache miss, representing speculative copies thereof; and
scheduling the speculative copies without regard to a corresponding speculation boundary, wherein operations of the speculative copies are scheduled above the corresponding speculation boundary and above a preceding operation that is likely to stall,
wherein the speculation boundary, which precedes the operations that form addressing chains, corresponds to an operation upon which the operations that form addressing chains depend.

37. The method of claim 36,
encoding the scheduled operations as part of the program code.

38. The method of claim 36,
wherein preceding operation that is likely to stall is a likely cache miss.

39. An apparatus comprising:
a code preparation facility for transforming schedulable code into scheduled code; and
means for scheduling speculative copies of operations that form dependency chains that lead to a likely stall, the scheduling placing the speculative operations above a preceding at least one other operation that is itself likely to stall, thereby hiding in the scheduled code latency of the speculative operations,
wherein the scheduling also places the speculative operations above a speculation boundary that precedes the operations that form the dependency chains,
wherein the speculation boundary corresponds to an operation upon which the operations that form the dependency chains are dependent.

40. The apparatus of claim 39, further comprising:
means for inserting pre-executable operations into the schedulable code, wherein at least some of the pre-executable operations are scheduled be the scheduling means as the speculative operations for which latency is hidden.

41. The apparatus of claim 39, further comprising:
means for identifying likely-to-stall operations of schedulable code.

* * * * *